United States Patent
Cai et al.

(10) Patent No.: US 11,967,055 B2
(45) Date of Patent: Apr. 23, 2024

(54) AUTOMATICALLY GENERATING DEFECT DATA OF PRINTED MATTER FOR FLAW DETECTION

(71) Applicant: International Business Machines Corporation, Armonk, NY (US)

(72) Inventors: Zhuo Cai, Beijing (CN); Chao Xin, Ningbo (CN); Dan Zhang, Beijing (CN); Hong Bing Zhang, Beijing (CN); De Bo Xiong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/363,095

(22) Filed: Jun. 30, 2021

(65) Prior Publication Data
US 2023/0004814 A1    Jan. 5, 2023

(51) Int. Cl.
*G06T 7/00* (2017.01)
*B41J 29/393* (2006.01)
(Continued)

(52) U.S. Cl.
CPC ........... *G06T 7/0002* (2013.01); *B41J 29/393* (2013.01); *G06N 3/086* (2013.01); *G06N 20/00* (2019.01)

(58) Field of Classification Search
CPC ......... G06T 7/0002; G06T 2207/30144; G06T 7/001; G06T 7/10; G06T 7/155; G06T 2207/10008; G06T 7/0004; G06T 2207/30168; G06T 3/4046; G06T 9/002; G06T 2207/20076; G06T 2207/20081; G06T 2207/20084; B41J 29/393; B41J 2/0451; B41J 33/0045; G06N 3/086; G06N 20/00; G06N 3/0895; G06N 3/0475;
(Continued)

(56) References Cited

U.S. PATENT DOCUMENTS 5,052,043 A * 9/1991 Gaborski ............... G06N 3/084
706/20
8,208,183 B2 6/2012 Wu
(Continued)

FOREIGN PATENT DOCUMENTS

JP         4620208 B2    8/2001
JP     2014198480 A    10/2014

OTHER PUBLICATIONS

Yanping, et al., "Real-time Defect Detection Method for Printed Images Based on Grayscale and Gradient Differences", Journal Of Engineering Science and Technology Review, 11 (1) (2018), 9 pgs., Received Aug. 7, 2017; Accepted Jan. 22, 2018, doi:10.25103/jestr.111.22.

*Primary Examiner* — Jose L Couso
(74) *Attorney, Agent, or Firm* — David B. Woycechowsky

(57) ABSTRACT

Technology for inspection for detecting a defect of a printed matter using machine logic informed by machine learning. Some embodiments of the present invention may include one, or more, of the following features: (i) generates defect datasets; (ii) generates defect libraries; (iii) uses the generated defect libraries for deep learning training; and (iv) uses machine learning to detect defects using computer code (for example, a *.jpg format file) corresponding to an image of a piece of printed matter instead of using a visual image (that is, an image of the type that is created when a person takes a picture using a traditional film camera).

18 Claims, 4 Drawing Sheets

(51) Int. Cl.
*G06N 3/086* (2023.01)
*G06N 20/00* (2019.01)

(58) Field of Classification Search
CPC ........ G06N 3/084; G06N 3/094; G06N 3/045;
G06N 3/02; G06N 3/08–088; G06N
3/0445; G06N 3/0454; G06N 3/4046;
G06N 7/00; B41F 33/0036; G06F 3/1208;
G06F 3/1232; G06F 3/1235; G06F 3/121;
G06F 3/1256; G06F 3/1282; G06F
18/214; G06K 15/027; G06K 7/1482;
H04N 1/00037; H04N 1/00045; H04N
1/6036; G06V 10/454; G06V 10/54;
G06V 10/774; G06V 10/82; G06V
30/18057; Y10S 128/925
See application file for complete search history.

(56) References Cited

U.S. PATENT DOCUMENTS

| | | | |
|---|---|---|---|
| 9,898,814 B2 | 2/2018 | Kitai | |
| 10,831,417 B1 | 11/2020 | Su | |
| 11,373,294 B2* | 6/2022 | Kailey | G06T 7/001 |
| 2013/0258386 A1* | 10/2013 | Wagner | G06T 7/001 |
| | | | 358/1.14 |
| 2019/0215410 A1* | 7/2019 | d'Armancourt | H04N 1/00005 |
| 2020/0134373 A1 | 4/2020 | Oikawa | |
| 2020/0307101 A1 | 10/2020 | Schultz | |
| 2021/0114368 A1 | 4/2021 | Ukishima | |
| 2021/0158092 A1* | 5/2021 | Seto | G06N 20/00 |
| 2021/0375008 A1* | 12/2021 | Hassan | H04N 19/20 |

\* cited by examiner

AUTOMATICALLY GENERATING DEFECT DATA OF PRINTED MATTER FOR FLAW DETECTION

BACKGROUND

The present invention relates generally to the field of detecting defects in printed matter.

The Wikipedia entry for "printed matter" (as of Apr. 15, 2021) in part states as follows: "Printed matter is a term, mostly used by mailing systems, normally used to describe mechanically printed materials . . . Printed matter [is] produced by printers or publishers, such as books, magazines, booklets, brochures and other publicity materials and in some cases, newspapers." (footnote(s) omitted) While the Wikipedia entry, partially reproduced in this paragraph, extensively discusses definitions of "printed matter" that are specific to postal services (for example, the US Post Office), "printed matter," as that term is used herein, includes all printed matter, regardless of whether the printed matter qualifies for any sort of special treatment when mailed through a post office.

The Wikipedia entry for "generative adversarial network" (hereinafter, sometimes GAN) (as of Apr. 15, 2021) in part states as follows: "A generative adversarial network (GAN) is a class of machine learning frameworks designed by Ian Goodfellow and his colleagues in 2014. Two neural networks contest with each other in a game (in the form of a zero-sum game, where one agent's gain is another agent's loss). Given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proven useful for semi-supervised learning, fully supervised learning, and reinforcement learning. The core idea of a GAN is based on the 'indirect' training through the discriminator, . . . which itself is also being updated dynamically. This basically means that the generator is not trained to minimize the distance to a specific image, but rather to fool the discriminator. This enables the model to learn in an unsupervised manner. The generative network generates candidates while the discriminative network evaluates them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network (i.e., 'fool' the discriminator network by producing novel candidates that the discriminator thinks are not synthesized (are part of the true data distribution)). A known dataset serves as the initial training data for the discriminator. Training it involves presenting it with samples from the training dataset, until it achieves acceptable accuracy. The generator trains based on whether it succeeds in fooling the discriminator. Typically, the generator is seeded with randomized input that is sampled from a predefined latent space (e.g. a multivariate normal distribution). Thereafter, candidates synthesized by the generator are evaluated by the discriminator. Independent backpropagation procedures are applied to both networks so that the generator produces better samples, while the discriminator becomes more skilled at flagging synthetic samples. When used for image generation, the generator is typically a deconvolutional neural network, and the discriminator is a convolutional neural network . . . . While the standard GAN model learns a mapping from a latent space to the data distribution, inverse models such as Bidirectional GAN (BiGAN) and Adversarial Autoencoders also learn a mapping from data to the latent space. This inverse mapping allows real or generated data examples to be projected back into the latent space, similar to the encoder of a variational autoencoder."

US patent application 2021/0114368 ("Ukishima") discloses as follows: "In printing of a printed matter, a defect such as ink loss, ink dripping, a scratch, and a streak may occur. For this reason, automatic inspection for detecting a defect of a printed matter is performed."

SUMMARY

According to an aspect of the present invention, there is a method, computer program product and/or system that performs the following operations (not necessarily in the following order): (i) creating a defects library; (ii) training a machine learning (ML) algorithm using the defects library to obtain a trained ML algorithm; (iii) receiving a first bitmap used to print a new original image; (iv) receiving a second bitmap corresponding to a new printed image that was printed from the new original image; and (v) applying the trained ML algorithm to the first and second bitmaps to detect a set of defect(s) in the printed image.

DETAILED DESCRIPTION

Figure 1:
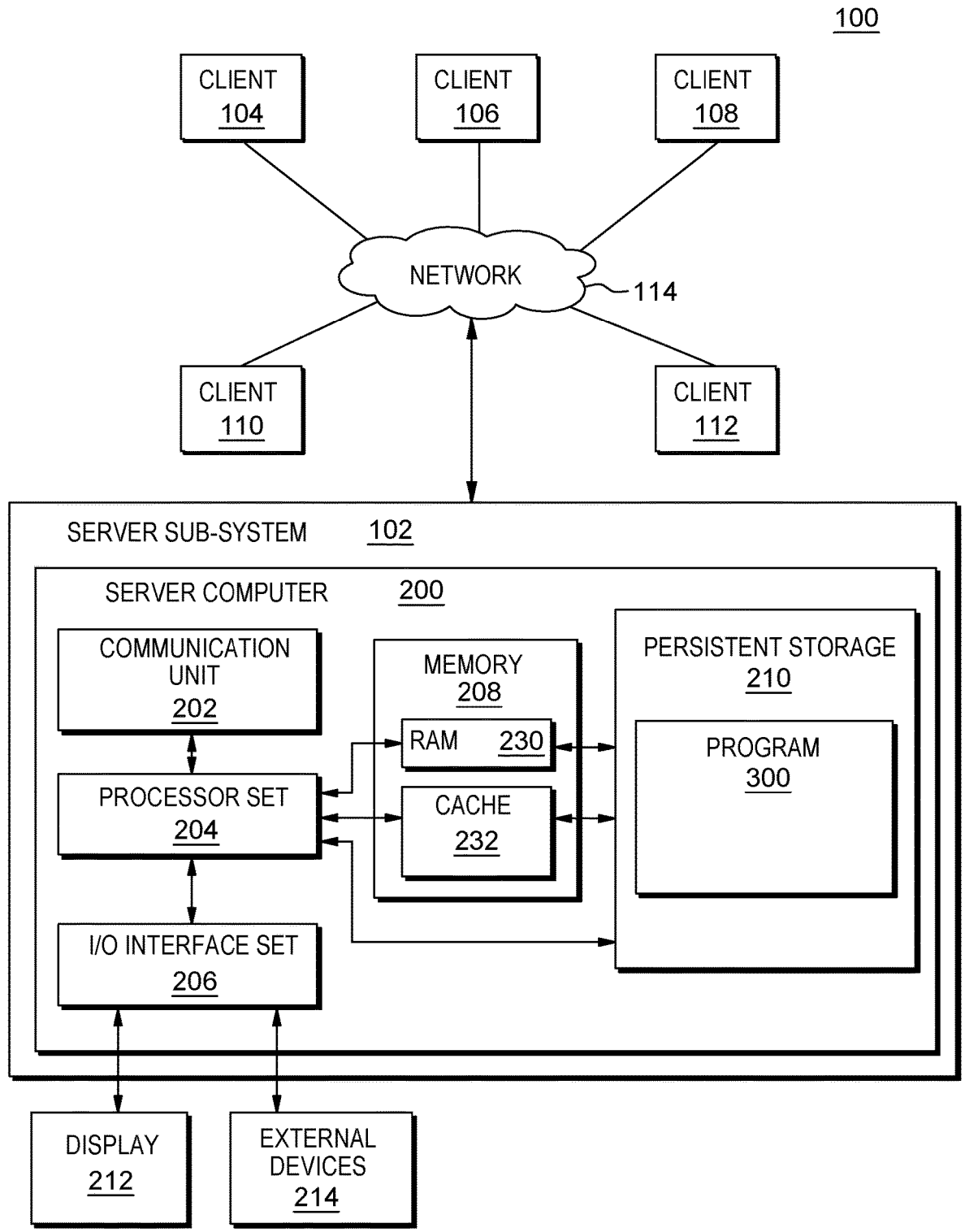
FIG. 1 is a block diagram view of a first embodiment of a system according to the present invention.

While automatic inspection for detecting a defect of a printed matter is already known, some embodiments of the present invention include one, or more, of the following features: (i) generates defect datasets; (ii) generates defect libraries; (iii) uses the generated defect libraries for deep learning training; and (iv) uses machine learning to detect defects using computer code (for example, a *jpg format file) corresponding to an image of a piece of printed matter instead of using a visual image (that is, an image of the type that is created when a person takes a picture using a traditional film camera). This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
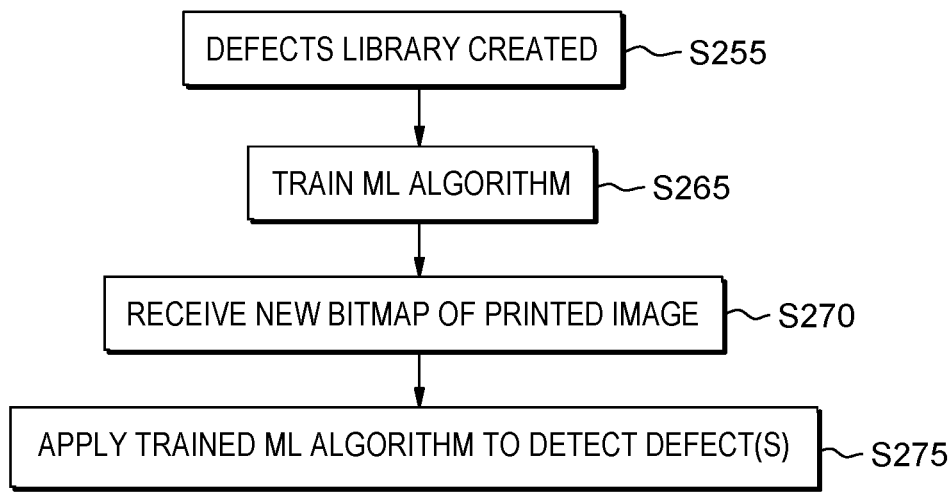
FIG. 2 is a flowchart showing a first embodiment method performed, at least in part, by the first embodiment system.
Figure 3:
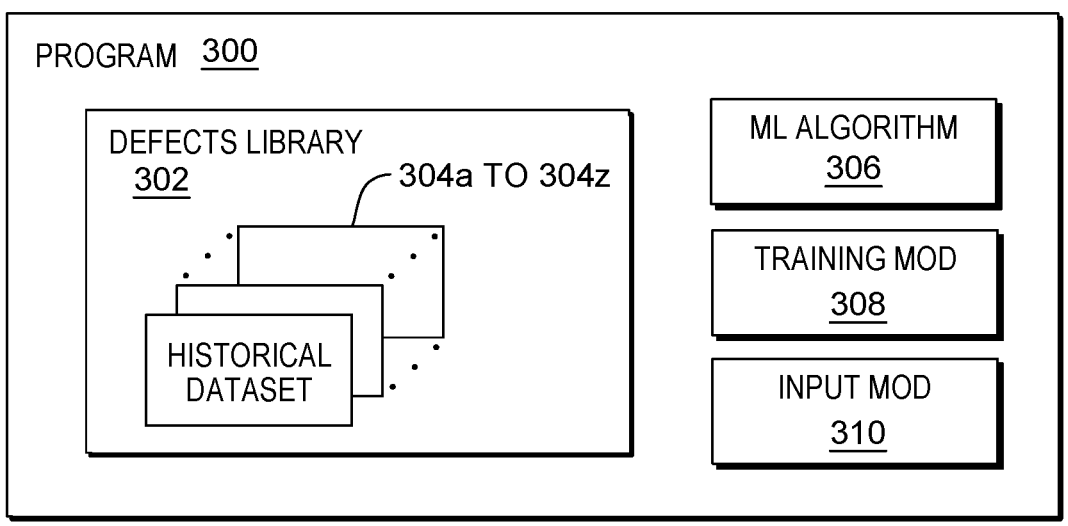
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins with operation S255, where defects library 302 is created. In this example, the defects library is made up of historical data sets 304a to 304z. Each historical data set 304a to z includes: (i) bitmap data corresponding to a bitmap of an original visual image used to make a printed image; (ii) bitmap data corresponding to a printed image of the original visual image; (iii) an indication of defect location within the bitmap of each and every defect existing in the image; and (iv) an indication of defect type of each and every defect existing in the image. In this simple example, there are only three defect types: blot, skip and skew.

Processing proceeds to operation S265, where machine learning algorithm 306 is trained using the defects library by training module ("mod") 308. Machine learning (ML) algorithm 306 is a collection of machine logic based rules that evolve over time as new training data is used to refine and improve the effectiveness and reliability of the ML algorithm.

Processing proceeds to operation S270, where input mod 310 receives: (i) a new bitmap used to print a new original image (that is, not an original image in the training data); and (ii) a new printed image that was printed from the new original image. In this example, the new original image and new printed image are both received from client subsystem 104 through network 114.

Figure 4:
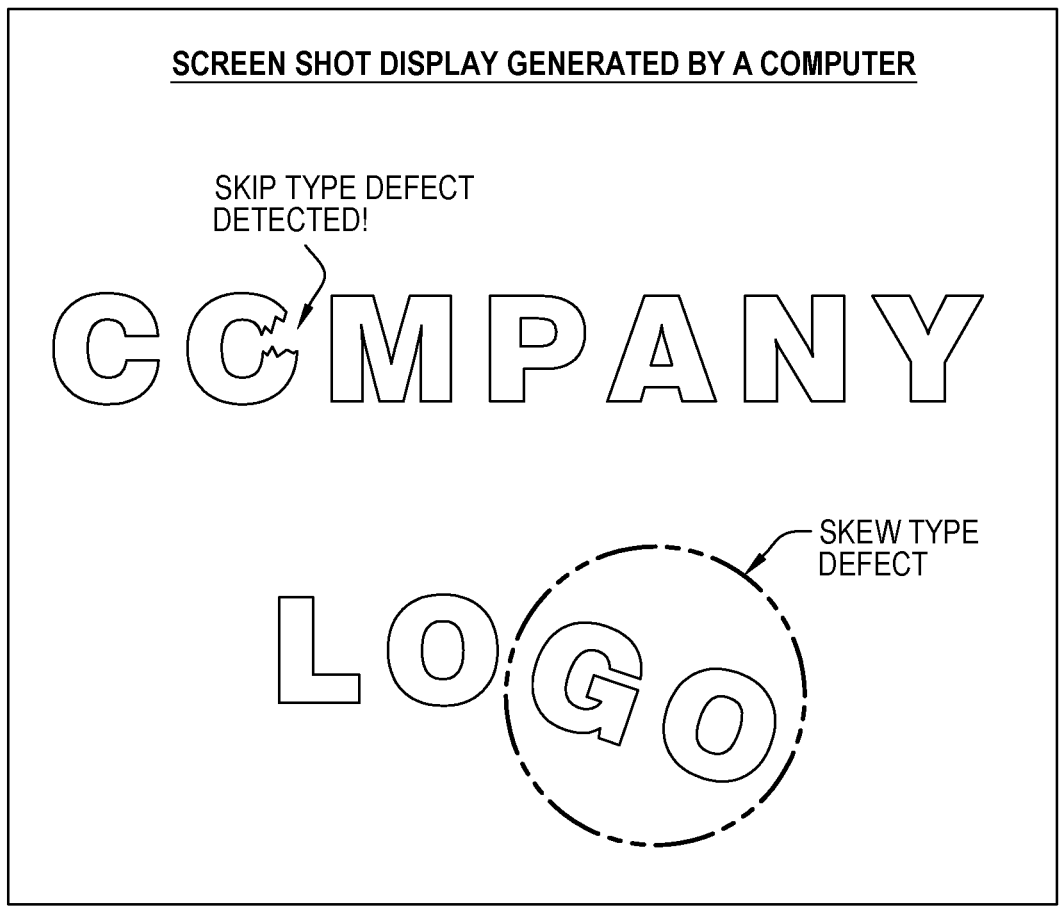
FIG. 4 is a screenshot view generated by the first embodiment system.

Processing proceeds to operation S275 where the machine logic based rules of ML algorithm 306 is applied to the new original image and its corresponding new printed image to detect defects. In this simple example and as shown in screenshot 400 of FIG. 4, there are two defects detected in the printed image, specifically one skew type defect and one blot type defect.

III. Further Comments and/or Embodiments

Some embodiments of the present invention recognize the following facts, potential problems and/or potential areas for improvement with respect to the current state of the art: (i) in the field of defect detection for printed matter, there have been some practices that manufacturers have developed (for example, existing methods require a lot of labor); (ii) for AI (artificial intelligence) based defect detection methodology, supervised learning ways are popular due to reliability and high accuracy, however, this method requires enormous training data with labeling; (iii) currently, businesses tend to use random syntheses, which can cause defects or defects being in the wrong position; (iv) random syntheses defects can affect the result of the model enormously; and/or (v) because the proportion of the defects in the pictures are quite small, consequently, this affect is likely to occur.

Some embodiments of the present invention recognize the following facts, potential problems and/or potential areas for improvement with respect to the current state of the art: (i) in the field of defect detection for printed matter, there have been some practices developed by manufacturing where: (a) there are many workers manually checking the quality of the printed matter, (b) the factories have to keep a number of workers as the quality checking team, and/or (c) traditional and AI based methods are now being developed; and/or (ii) for existing methods, a lot of labor is required where: (a) for AI based defect detection methodology, supervised learning methods are popular for being reliable and having high accuracy, (b) AI based defect detection methodology requires enormous training data with labeling, and/or (c) a lot of labor must be done by humans manually, that is, labeling.

Some embodiments of the present invention recognize the following facts, potential problems and/or potential areas for improvement with respect to the current state of the art: (i) data quantity is a bottleneck where: (a) in defect detection of printed matter, bad labeled data will seriously influence the training results since the defects are a very small proportion in the images, (b) the process must be repeated when a new product is introduced into the pipeline, and/or (c) different types of defects are out of proportion, consequently, certain types of defects are hard to find which results in having bad results of the model; and/or (ii) data quality will influence the model results enormously where: (a) businesses try using synthesized data, but run into problems of data quality, (b) existing methods, such as GAN (generative adversarial network)/traditional methods, are not satisfactory since there will be a lot of bad quality data generated without plausibility checking, (c) GAN will introduce defects that don't belong in the supposed defect categories, and/or (d) common synthesis will create a great deal of inappropriate data since there is no checking.

A method according to an embodiment of the present invention includes the following operations (not necessarily in the following order): (i) raises a new way to generate the data with defects based on maintained defects, (ii) can help manufactures save labor for labeling costs; (iii) can guarantee the data quality for better training; and (iv) can be divided into the following operations: (a) construct a fundamental defects base, (b) construct the principle to decide if the defects are plausible, (c) define the rules such as color difference, shape and overlap with text, (d) when the new product is to be made, the manufacturer only needs to provide a template image instead of pictures on the manufacturing pipeline, (e) synthesizes the pictures based on the defect base and defect rules automatically, (f) the defect base can be extended by, in practice, by adding the new defects, (g) the model can be trained half-supervised and online by using the data which was generated automatically, and (h) uses standards to check plausibility.

Some embodiments of the present invention may include one, or more, of the following operations, features, characteristics and/or advantages: (i) discloses a method to generate the data with defects based on maintained defects, (ii) can help manufactures save labor costs for labeling; (iii) can guarantee the data quality for better training; (iv) a fundamental defect base is constructed; (v) a defect detection model can be trained, half-supervised and online, by using the data which was generated automatically; (vi) builds a defect library; and/or (vii) builds a semi-supervised defect detection deep learning model.

A method according to an embodiment of the present invention includes the following operations (not necessarily in the following order): (i) decides whether the synthesized images are plausible using the following principles/rules: (a) color difference: the RGB (red, green, blue) values of the background color and flaws will be analyzed to get the appropriate threshold, so that if plausible, the color difference can be detected, (b) shape: for different defects, they will differ obviously in shape features, so the feature analyses or statistical analyses will be conducted (for example, using clustering with k-means to filter out defects which are not plausible), (c) text overlap: text detection technology will be used to get the text area on the printed matter in order to form/avoid flaw overlapped with the text, and (d) Siamese network: a Siamese network will be used to verify if the copy/paste or random erase effects are plausible; and (ii) when synthesizing data, with the above stated standards, the quality of the data can be guaranteed.

Figure 5:
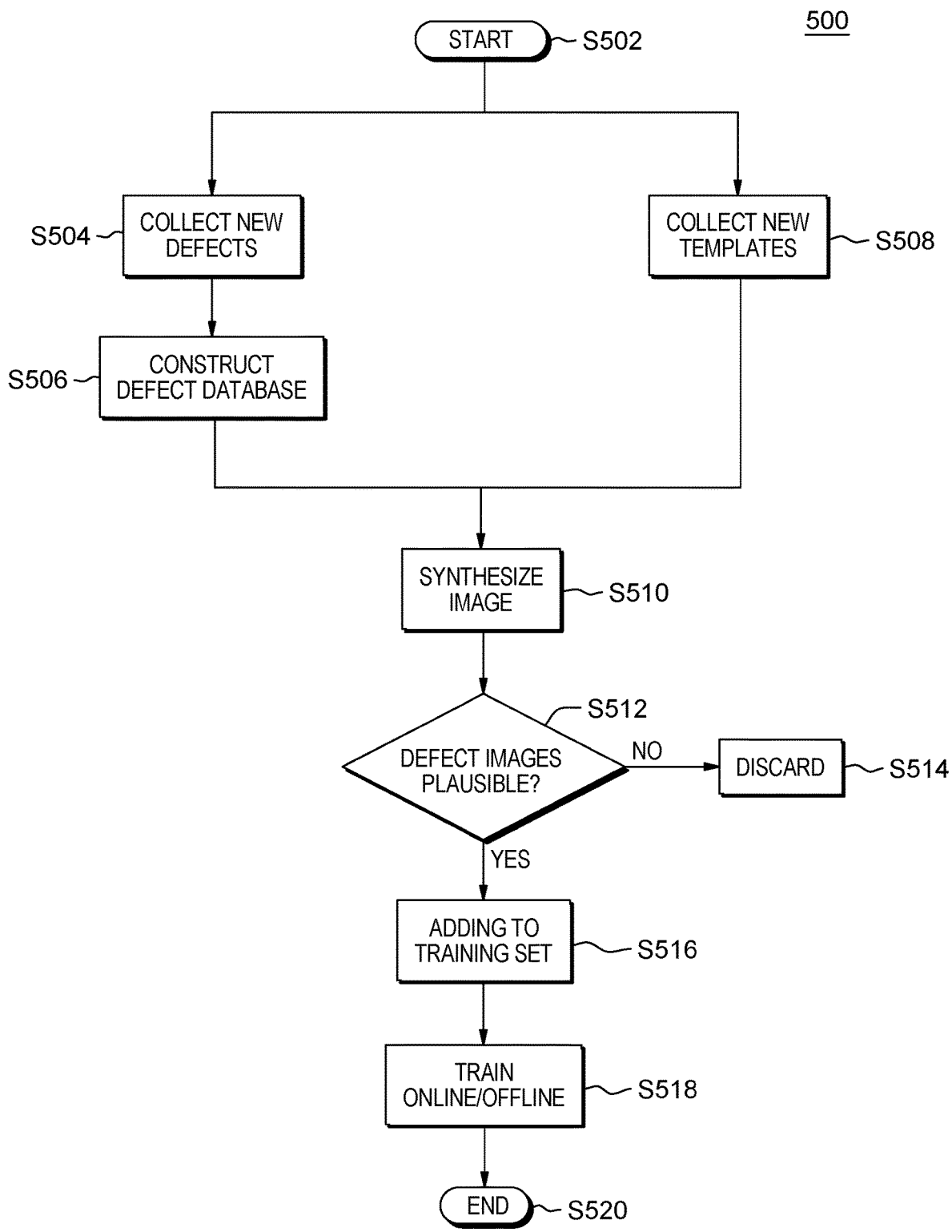
FIG. 5 is a flowchart showing a second embodiment method according to the present invention.

As shown in FIG. 5, flowchart 500 includes: start block S502; collect new defects block S504; construct defect database block S506; collect new templates block S508; synthesize image block S510; defect images plausible decision (Yes/No) block S512; discard block S514; add to training set block S516; train online/offline block S518; and end block S520.

In operation S502 the operation starts.

In operation S504, new defects are collected.

In operation S506, a defect database is constructed. The defects collected in operation S504 above are added to this new defect database.

In operation S508, a new template image is collected.

In operation S510, the image is synthesized by adding defects and copying them to any area of the new template image.

In operation S512, a decision is made as to whether the images are plausible. Here, the rationality of the synthesized image can be determined by judging the color difference, shape and template difference between the defect part and the surroundings.

In operation S514, the image is discarded if the synthesized image is not plausible, as determined by operation S512 above.

In operation S516, the image is added to a training set if the synthesized image is determined to be plausible, as determined by operation S512 above.

In operation S518, the training set can be used for online or offline training which means that the above operations can be completed online or offline.

In operation S520, the method of flow chart 500 ends.

Some embodiments of the present invention may include one, or more, of the following operations, features, characteristics and/or advantages: (i) generates defect datasets; (ii) generates defect libraries; (iii) the generated defect library is used for deep learning training; (iv) does not use a generated network for defect detection; and/or (v) defect images come from code generation (such as copy and paste).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
creating a defects library;
training a machine learning (ML) algorithm using the defects library to obtain a trained ML algorithm;
receiving a first bitmap used to print a new original image;
receiving a second bitmap corresponding to a new printed image that was printed from the new original image; and
applying the trained ML algorithm to the first and second bitmaps to detect a set of defect(s) in the printed image.

2. The CIM of claim 1 wherein the defects library includes a plurality of historical data sets, with each historical data set including: (i) bitmap data corresponding to a bitmap of an original visual image used to make a printed image; (ii) bitmap data corresponding to a printed image of the original visual image; (iii) an indication of defect location(s) within the bitmap data corresponding to a printed image; and (iv) an indication of defect type defect location(s).

3. The CIM of claim 1 wherein the defect types include at least one of the following: missing words, broken words, skip, scratch, blot, skew and/or extra ink.

4. The CIM of claim 1 wherein the defect types include all of the following: missing words, broken words, skip, scratch, blot, skew and/or extra ink.

5. The CIM of claim 1 wherein the ML algorithm is a collection of machine logic based rules that evolve over time as new training data is used to refine and improve effectiveness and reliability of the ML algorithm.

6. The CIM of claim 1 further comprising:
generating a display data set corresponding to a display for a display device, with the display indicating a defect location within the printed image for each detected defect of the set of defect(s).

7. A computer program product (CPP) comprising:
a set of storage device(s) which is non-transitory; and
computer code stored collectively in the set of storage device(s), with the computer code including data and instructions to cause a processor(s) set to perform at least the following operations:
creating a defects library,
training a machine learning (ML) algorithm using the defects library to obtain a trained ML algorithm,
receiving a first bitmap used to print a new original image, receiving a second bitmap corresponding to a new printed image that was printed from the new original image, and applying the trained ML algorithm to the first and second bitmaps to detect a set of defect(s) in the printed image.

8. The CPP of claim 7 wherein the defects library includes a plurality of historical data sets, with each historical data set including: (i) bitmap data corresponding to a bitmap of an original visual image used to make a printed image; (ii) bitmap data corresponding to a printed image of the original visual image; (iii) an indication of defect location(s) within the bitmap data corresponding to a printed image; and (iv) an indication of defect type defect location(s).

9. The CPP of claim 7 wherein the defect types include at least one of the following: missing words, broken words, skip, scratch, blot, skew and/or extra ink.

10. The CPP of claim 7 wherein the defect types include all of the following: missing words, broken words, skip, scratch, blot, skew and/or extra ink.

11. The CPP of claim 7 wherein the ML algorithm is a collection of machine logic based rules that evolve over time as new training data is used to refine and improve effectiveness and reliability of the ML algorithm.

12. The CPP of claim 7 wherein the computer code further includes instructions for causing the processor(s) set to perform the following operation(s):

generating a display data set corresponding to a display for a display device, with the display indicating a defect location within the printed image for each detected defect of the set of defect(s).

13. A computer system (CS) comprising:

a processor(s) set;

a set of storage device(s); and computer code stored collectively in the set of storage device(s), with the computer code including data and instructions to cause the processor(s) set to perform at least the following operations:

creating a defects library, training a machine learning (ML) algorithm using the defects library to obtain a trained ML algorithm, receiving a first bitmap used to print a new original image, receiving a second bitmap corresponding to a new printed image that was printed from the new original image, and applying the trained ML algorithm to the first and second bitmaps to detect a set of defect(s) in the printed image.

14. The CS of claim 13 wherein the defects library includes a plurality of historical data sets, with each historical data set including: (i) bitmap data corresponding to a bitmap of an original visual image used to make a printed image; (ii) bitmap data corresponding to a printed image of the original visual image; (iii) an indication of defect location(s) within the bitmap data corresponding to a printed image; and (iv) an indication of defect type defect location(s).

15. The CS of claim 13 wherein the defect types include at least one of the following: missing words, broken words, skip, scratch, blot, skew and/or extra ink.

16. The CS of claim 13 wherein the defect types include all of the following: missing words, broken words, skip, scratch, blot, skew and/or extra ink.

17. The CS of claim 13 wherein the ML algorithm is a collection of machine logic based rules that evolve over time as new training data is used to refine and improve effectiveness and reliability of the ML algorithm.

18. The CS of claim 13 wherein the computer code further includes instructions for causing the processor(s) set to perform the following operation(s):

generating a display data set corresponding to a display for a display, with the display indicating a defect location within the printed image for each detected defect of the set of defect(s).

* * * * *